April 18, 1944.  T. A. BOWERS  2,346,898
METHODS OF MAKING SLOTTED PISTON RINGS
Filed Aug. 20, 1941
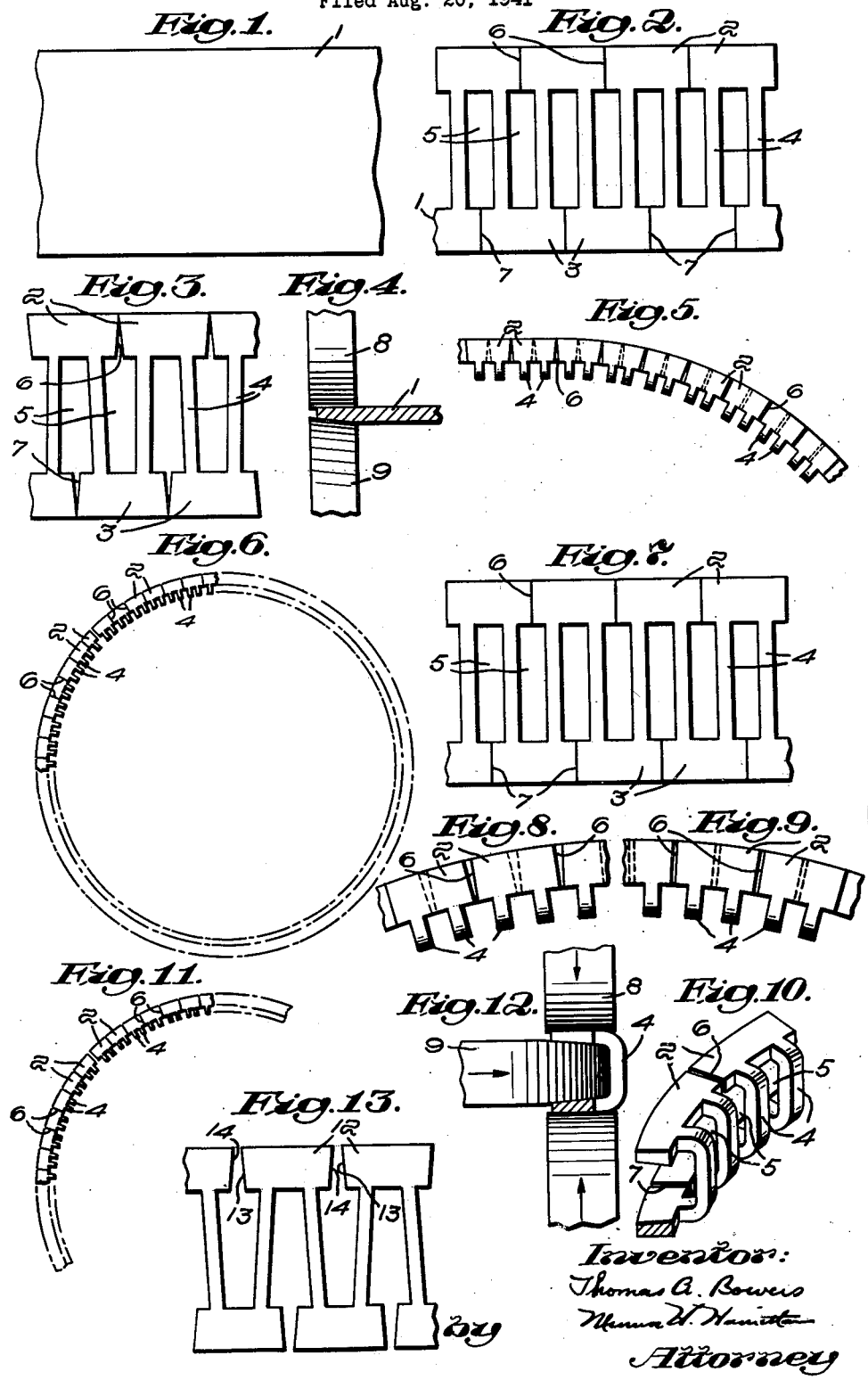

Patented Apr. 18, 1944

2,346,898

UNITED STATES PATENT OFFICE 2,346,898

METHOD OF MAKING SLOTTED PISTON RINGS

Thomas A. Bowers, Mattapoisett, Mass., assignor to Power Research Corporation, Boston, Mass., a corporation of Massachusetts Application August 20, 1941, Serial No. 407,577

4 Claims. (Cl. 29—156.6)

This invention relates to flexible piston rings and more especially to methods of making piston rings of the type in which a plurality of spaced-apart segments of piston ring material are aligned in annular rows and resiliently connected one to another.

It is a chief object of the invention to improve piston rings and to devise improved methods of forming segments of resilient piston ring material, with a view to facilitating circumferential spacing of the segments and to overcoming variation in such circumferential spacing of the segments throughout the radial width of the ring. The invention also aims to provide cheap, simple, fast, and accurate methods of making segmental piston rings.

The nature of the invention, and its objects, will be more fully understood from the following description of the drawing and discussion relating thereto.

In the accompanying drawing:

Fig. 1 is a fragmentary plan view of piston ring material employed in carrying out the method of the invention;

Fig. 2 is a fragmentary plan view illustrating a step in the method of the invention;

Fig. 3 is a fragmentary plan view illustrating another step in the method referred to;

Fig. 4 is a fragmentary diagrammatic view illustrating means employed in carrying out the method of the invention;

Fig. 5 is a fragmentary plan view further illustrating the method;

Fig. 6 is a plan view of a ring formed by the steps illustrated in Figs. 1-5 inclusive;

Fig. 7 is a fragmentary plan view illustrating a step in a modified method of making a piston ring;

Fig. 8 is a fragmentary plan view illustrating another step in the modified method referred to;

Fig. 9 is a fragmentary plan view illustrating still another step in the modified method;

Fig. 10 is a fragmentary perspective view of a ring obtained by the steps illustrated in Figs. 7, 8, and 9;

Fig. 11 is a plan view of a finished ring similar to the ring illustrated in Fig. 10;

Fig. 12 is a diagrammatic view illustrating means employed in carrying out the modified method illustrated in Figs. 7-11 inclusive; and Fig. 13 is a fragmentary plan view of a partially formed strip of piston ring material illustrating a further modified method of making piston rings.

In an earlier Patent No. 2,224,338, issued to me December 10, 1940, I have described and claimed a sheet metal oil control piston ring and method of manufacture, in which a strip of piston ring material is cut to provide partially severed crowns along edges of the strip and supporting portions for the crowns intermediate the edges of the strip. The cuts, in addition to defining crowns and supporting portions, overlap one another. The strip thus formed is bent longitudinally of itself and again bent annularly to form the ring in which the crowns occur in circumferentially movable relation with respect to one another, thereby imparting very desirable flexibility to the ring.

In making the cuts necessary to define the partially severed crowns and supporting portions, cutting operations are preferably resorted to which provide slits. When the folded strip is bent around into a circle, these slits become slightly spread apart to form diverging V-shaped cuts. The crowns are aligned in annular rows to form sealing flanges for preventing escape of oil by the ring and therefore it is desirable to avoid diverging or V-shaped openings between the segments, and to provide for the segments being circumferentially spaced apart a substantially uniform amount throughout the radial width of the ring.

In accordance with the present invention, I provide methods of forming crowns of a shape which provides for these crowns, when arranged in contiguous relation in annular rows, being circumferentially spaced apart a uniform distance throughout the radial width of the ring. In general, this object is achieved by forming the crowns so as to provide substantially wedge-shaped elements.

Referring more in detail to the drawing, Figs. 1-6 inclusive illustrate a method of making a piston ring of the same general character as that described in connection with the above noted patent. A strip of resilient piston ring material I is subjected to cutting operations suitable for providing partially severed crowns 2 and 3 and supporting portions 4 for the crowns. Preferably the cutting operations are of two types; one being a punching operation which results in the formation of oil spaces 5, and the second being a shearing operation which results in the formation of cuts or slits 6 and 7 along opposite edges of the strip.

The strip of piston ring material thus partially severed, and while still in a flat state, is subjected to pressure directed along the edges of the crowns 2 and 3. One suitable means of applying pressure consists in utilizing roll members 8 and 9, such as illustrated in Fig. 4, and of which roll 9 presents a beveled surface. The result of squeezing the edges of the crowns 2 and 3 between roll members of this character is to thin the crowns more at the outer edges than the inner edges, and generally to increase the length of the crowns. By thus increasing the length of the crowns, the slits 6 and 7 become opened up into inwardly diverging openings, as is more clearly illustrated in Fig. 3 of the drawing. At the same time, the crowns themselves assume a wedge-shaped formation, and the supporting portions 4 become arranged in a slightly offset manner with respect to one another.

Thereafter the strip of material is bent along longitudinal lines of folding to arrange the crowns 2 and 3 in upper and lower spaced-apart parallel rows and then bent into a circular position to form an annular body in which the wedge-shaped crowns 2 and 3 constitute segments of the circle and each of the crowns is circumferentially spaced apart a uniform amount throughout the radial width of the ring, as is more clearly illustrated at the right-hand side of Fig. 5.

An important feature of the method described is the step of applying pressure to the edges of the crowns so as to increase the length of their outer edges and obtain substantially wedge-shaped members, thus spreading the slits or openings between the crowns into substantially V-shaped openings.

It is pointed out that when the edges of the strip are bent longitudinally over upon one another and the crowns are arranged in an annular body, the V-shaped openings are adapted to close at the inner edges of the crowns and open at the outer edges thereof a corresponding amount, thus providing substantially uniform spacing at all points between the crowns in the finished ring.

This uniform circumferential spacing of the crowns allows them to be compacted very closely beside one another and constitute an efficient sealing surface adapted to prevent passage of oil between itself and a side of a piston ring groove.

If desired, the rolling operation, or step of applying pressure to the crowns may be carried out at other points. For example, in Figs. 7-12 inclusive, I have illustrated a modified method in which a strip of piston ring material 1 is cut to provide segments 2 and 3, supporting portions 4, oil spaces 5, and openings or slits 6 and 7. The strip thus formed is bent longitudinally of itself and then bent into an annular position to form a ring body. It will be observed that the openings 6, due to the annular arrangement of the crowns, become V-shaped and diverge outwardly, tending to provide relatively large spaces of undesirable character, as illustrated in Fig. 8.

The ring of material thus formed is subjected to a step of rolling the crowns, or otherwise applying pressure to the crowns, as has, for example, been illustrated by the rolls 8 and 9 in Fig. 12. The edges of the crowns 2 are thinned and increased in a direction circumferentially of the ring, to provide substantially wedge-shaped elements or segments, which fill in part of the space between the outwardly diverging interstices 6, as shown in Fig. 8, and cause these openings to become of substantially uniform spacing throughout the radial width of the ring, as shown in Fig. 9.

The advantages referred to in connection with the method illustrated in Figs. 1-6 inclusive are equally pertinent with respect to the modified method.

In Fig. 13 I have illustrated still another method of forming wedge-shaped crowns which consists in cutting a strip of piston ring material to form segments 12 with inwardly converging edges as 13 and 14. This operation is carried out by stamping out pieces of the strip as by punching. The result is to provide a strip generally corresponding to the strip shown in Fig. 3 and adapted to be bent longitudinally and circularly in the usual manner.

It is intended that the step of applying pressure to partially severed crowns may be carried out in various other ways and by the use of various other instrumentalities than rolls. For example, a ring in a form such as that illustrated in Fig. 9 may be placed in a tapered cylindrical sleeve, held between blocks, and forced through a gradually decreasing diameter, which tends to flow the metal of the crowns and close them tightly against one another, after which they may be opened slightly by stretching. Also both cutting and thinning wedge-shaped crowns may be carried out in making segmental rings in which a strip of piston ring material is cut along one edge only and then transversely folded to form a ring.

While I have shown a preferred embodiment of the invention, it should be understood that various changes and modifications may be resorted to without departing from the spirit of the invention as defined by the appended claims.

I claim:

1. That improvement in methods of making piston rings which comprises cutting a strip of resilient piston ring material to provide spaced-apart transverse cuts, said cuts extending alternately from one edge of the strip to points within an opposite edge thereof, thereby forming partially severed crowns along edges of the strip and connecting portions for the crowns intermediate the edges of the strip, applying pressure along one edge of the strip to thin the crowns occurring therealong relatively more at their outer edge than at their inner edge to provide a series of successive wedge-shaped crowns, the same sides of successive wedges on the same side of the strip being substantially parallel, and bending the supporting portions and crowns into a split ring body in which opposed sides of successive wedges of the said side of the strip are arranged in parallel relation.

2. That improvement in methods of making piston rings which comprises cutting a strip of resilient piston ring material to provide transverse spaced-apart slots, said slots alternately extending between an edge of the strip and points within an opposite edge thereof, thereby forming partially severed crowns and connecting portions for the crowns, applying pressure along one edge of the strip to form the crowns into a series of successive wedges, the same sides of successive wedges being substantially parallel, bending the connecting portions into a generally U-shaped body, and again bending the connecting portions to form a split ring body in which the connecting portions extend radially and opposite sides of successive wedges of the same side of the strip are arranged in parallel relation.

3. That improvement in methods of making piston rings which comprises cutting a strip of resilient piston ring material to provide transverse spaced-apart slots, said slots alternately extending between an edge of the strip and points within an opposite edge thereof to form substantially severed crowns and connecting portions for the crowns, applying pressure to the crowns to increase the length of successive crowns and form wedges, the same sides of successive wedges being substantially parallel, bending the strip into a generally U-shaped body, and then bending the connecting portions into a radially extending position whereby adjacent edges of successive wedges become arranged in substantially parallel relation.

4. That improvement in methods of making piston rings which comprises cutting a strip of resilient piston ring material to provide transverse spaced-apart slots, said slots alternately extending between an edge of the strip and points within an opposite edge thereof, thereby forming partially severed crowns and connecting portions for the crowns, applying pressure to the crowns along one edge of the strip to form wedges, the same sides of successive wedges lying in substantially parallel relation, bending said strip into a substantially U-shaped body in which the crowns occur in spaced-apart parallel rows, and then bending the wedges and crowns into a ring body so that opposed edges of successive wedges are arranged in a substantially parallel relation throughout the radial width of the ring.

THOMAS A. BOWERS.